INVENTOR.
LLEWELYN B. STEARNS
BY Forrest J. Lilly
ATTORNEY

United States Patent Office 3,266,963 Patented August 16, 1966

3,266,963

METHOD AND MEANS FOR ETCHING GLASS AND GLASS REINFORCED PLASTICS

Llewelyn B. Stearns, Pico Rivera, Calif., assignor to Chemical and Aerospace Products, Inc., Wilmington, Calif., a corporation of California Filed July 22, 1965, Ser. No. 477,352
12 Claims. (Cl. 156—24)

This application is a continuation-in-part of my copending application Serial No. 250,924 filed January 11, 1963, and entitled Method for Etching Glass Reinforced Plastics.

This invention relates to the chemical milling of materials, and is directed especially to the chemical milling or etching of glass and to the etching of certain glass-reinforced plastic materials.

The chemical milling or etching of glass, per se, by means of a solution of hydrofluoric acid is well known. The rate at which the etching of glass by this means proceeds is difficult to control because, as the etching proceeds, the rate of etch is substantially affected because of the variable amount of water introduced into the etch solution through regeneration of the etch solution and through water addition by chemical reactions taking place in the solution. In order to closely control the etch rate of glass, it is found that control of the water content in which the hydrofluoric acid resides is the most critical factor.

It is in the method and means for controlling the water content of the etching solution—whether the material to be etched is glass alone or whether the material to be etched is a glass-plastic resin formulation—that this invention is directed.

More specifically, and with reference particularly to the etching of glass, it is a major object of this invention to provide a method and means for etching glass which are more reliable and controllable than the method and means of the prior art.

Still a further object of the present invention is to provide a method and means for etching or chemical milling materials of glass wherein close control over the etch or milling rate is achieved in a relatively simple and inexpensive manner.

The chemical milling or etching of glass-reinforced plastics, such as glass-reinforced epoxy and glass-reinforced polyester formulations (for example, those used as insulating boards in the electrical industry or which are copper clad for printed circuit applications) have been frequently employed in the past. Chemical milling has also been employed to manufacture complex parts and shapes of reinforced plastics to avoid costly tooling and dies. Perhaps the best etching composition employed heretofore for these purposes has been a combination of about 1 to 2 parts sulfuric acid (98% acid concentration) and 0.5 to 1 part hydrofluoric acid (actually comprising 70% hydrofluoric acid and 30% water). The function of the sulfuric acid is to etch the epoxy or polyester resin while the function of the hydrofluoric acid is to etch the glass. The precise ratio of these particular acids initially employed is determined mainly by the rate of etching or milling desired for the glass and resin components of the glass-reinforced resin formulation.

However, it has been found, in using the etch composition just described, that the rate of attack upon the fibrous glass component of the base glass-plastic formulation or laminate is very quickly reduced to an etch rate of less than 1 to 2 mils/min. under normal temperatures of operation, say 100–150° F. Such low rates of attack on the glass necessarily require that the plastic component be subjected to the action of sulfuric acid for what may be too long a period of time in terms of the deleterious effect upon the physical properties of the laminate.

Furthermore, if the etching solution is replenished or "rejuvenated" by addition of the aforementioned hydrofluoric acid (containing 30% water), several other disadvantages arise. The rate of attack of the hydrofluoric acid upon the plastic becomes difficult to accurately control and the rate of etching and milling to be accomplished still rapidly deteriorates, due to the addition of water along with the hydrofluoric acid. Furthermore, the cost of such hydrofluoric acid replenishment is high.

Bearing in mind the foregoing facts, it is another major object of the present invention to provide a method and means for etching or chemical milling epoxy-glass laminates, that is, epoxy resin impregnated glass fibrous materials, and polyester-glass laminates, that is, polyester impregnated glass fibrous materials, which are more reliable and controllable than the method and means of the prior art.

It is still another object of the present invention to provide a method and means for etching or chemical milling materials of the classes just described which enables a substantially greater rate of etch to be maintained upon the glass than has been obtained heretofore.

Yet a further object of the present invention is to provide a method and means for etching or chemical milling materials of the class just described wherein great control over the etch or milling rate is achieved, at or near the maximum rate possible, in a relatively simple and inexpensive manner.

These and other objects of the present invention will become clearly understood by referring to the following description and accompanying drawings wherein.

Figures 1, 2, 3:
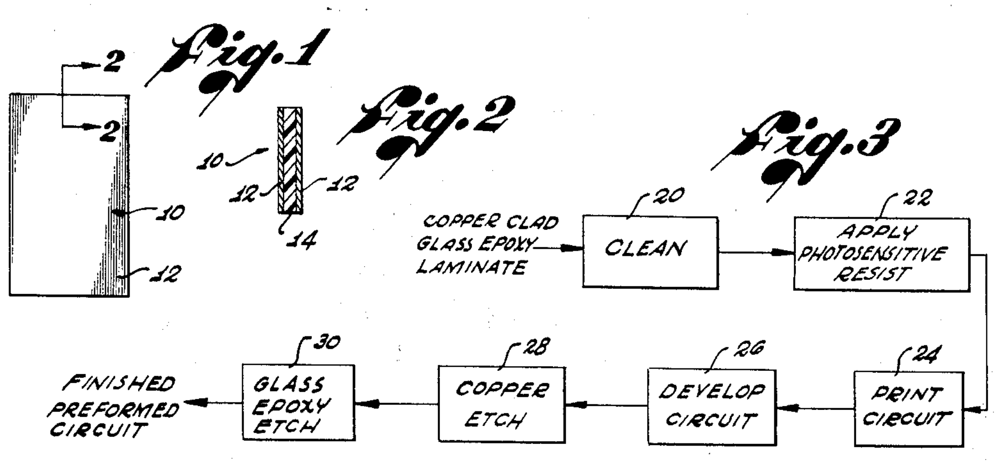
FIGURE 1 is a plan view of a copper clad glass-reinforced plastic laminate employed in my invention.
FIGURE 2 is a cross-section thereof along the line 2—2 of FIGURE 1.
FIGURE 3 is a block diagram of the steps employed in preparing a preformed circuit by means of my invention.

In general, my invention provides a method and means for maintaining the water concentration in the etch solution within relatively narrow limits, preferably between about 26–52% water, by weight, of etch solution where a glass-plastic resin formulation is the material to be etched, and preferably between about 5–25% water where glass alone is to be etched. (The terms "etch" and "chemical milling" are used interchangeably in this specification and claims.)

It has been found that the concentration of water is a critical consideration if close dimensional tolerances are to be obtained, and if a predetermined etch rate is to be maintained. Specifically, it has been found that there is an optimum range of water concentration for a specific sulfuric acid-hydrofluoric acid etch bath, and that the etch rate upon glass-reinforced plastic materials can therefore be maximized. In etching glass only, it is found that control of etch is most important for most applications, e.g., the production of non-reflective glass, as opposed to a high etch rate, and for this reason it is found that operating at 5–25% water content gives the desired results even though the etch rate could be maximized at a higher water content.

The means for maintaining the sulfuric acid-hydrofluoric acid-water concentration substantially constant, once the optimum ranges have been ascertained, also forms part of my invention.

Turning now to the process, process steps will first be described with reference to the production of a preformed copper circuit from a copper clad glass-epoxy laminate, although it will be understood that copper clad glass-reinforced polyester resin materials can also be employed. The process steps will thereafter be described in relation to the etching of glass alone.

Typical glass-epoxy laminates employed are those produced by The Mica Corporation of Culver City, California, under the grade designations of EG–752–T, EG–758–T and EG–899–T. These laminates are composed of an epoxy-resin-impregnated glass cloth base laminate which may be copper clad on one or both sides thereof. The base glass-epoxy laminate may vary in thickness from about 1/64" to 1/2", and the thickness of the copper cladding may vary from about 0.0014" to 0.0042".

The glass in the core of the laminate may be present in the form of chopped strands, rovings, mats, or other non-woven fibrous forms, as well as in the form of woven cloth. The epoxy resins employed are now well known, and need not be discussed at any great length here.

The most useful of these epoxide resins is made from the reaction of a polyhydric phenol with epihalohydrin or glycerol dihalohydrin and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., a 1,2-epoxy-equivalency greater than one. Dihydric phenols that can be used for this purpose include bisphenol, resorcinol, catechol, hydroquinone, methyl resorcinal, 2,2-bis(4-hydroxyphenyl) butane, 4,4'-dihydroxybenzophenone, bis(4-hydroxyphenyl) ethane, and 1,5-dihydroxy naphthalene. The preparation of polyepoxides from polyhydric phenols and epihalohydrin is described in U.S. Patents 2,467,171; 2,538,072; 2,582,985; 2,615,007 and 2,698,315, the proportion of halohydrin to dihydric phenol being at least about 1.2 to 1, up to around 10 to 1.

Higher melting point resins are made from the reaction of such resins with a further amount of dihydric phenol less than that equivalent to the epoxide content of the resin, as set forth in U.S. Patent 2,615,008. Halohydrins can be further exemplified by 3-chloro-1,2-epoxy butane, 3-bromo-1,2-epoxy hexane, 3-chloro-1,2-epoxy octane and the like. Another group of glycidyl polyethers is produced by the reaction of a polyhydric alcohol with epichlorhydrin or glycerol dichlorhydrin as disclosed in Zech, U.S. Patent 2,581,464. Preferred polyepoxides are glycidyl polyethers of aromatic polyhydric compounds having weights per epoxide group of 180 to 2000.

Specific examples of epoxide resins that may be employed are the EPON® resins, manufactured by the Shell Chemical Corporation.

A typical copper clad glass-epoxy laminate employed in my invention is shown in FIGURES 1 and 2, and is generally designated by the numeral 10. The copper cladding is designated by the numeral 12, and the glass-epoxy core or base laminate by the numeral 14. The laminate 10 is first cleaned in any suitable manner, e.g., by vapor degreasing, followed by immersion in 8% hydrochloric acid for 30 seconds at room temperature, and by rinsing and drying. The cleaning step is indicated generally in FIGURE 3 by the numeral 20.

A photosensitive resist is then coated onto both sides of the laminate 10 as shown by block 22. The photosensitive resist employed is an organic solvent solution of an ultraviolet-sensitive plastic. The resist, when applied to the base glass-plastic laminate, is water-insoluble and water-resistant. Areas of the resist which are exposed to ultraviolet light offer high chemical resistance to organic solvents (termed the "developer" in the art) while the non-exposed portions of the resist are readily developed. The Eastman Kodak Company's photosensitive resists and developers are generally employed in my process, and are described in Kodak Publication No. P–7, dated May 1962, and entitled "Kodak Photosensitive Resists for Industry." The resists particularly employed are Kodak's KPR (Kodak Photo Resist), although KMER (Kodak Metal-Etch Resist) is also employed successfully.

Other resists or maskings may also be employed, such as silk-screen resists. Still other masking procedures will be apparent to those skilled in the art.

As mentioned, the KPR or KMER resists are preferably utilized at the present time for masking the laminate surfaces. The organic solvent developer (employed in conjunction with KPR or KMER) are the Kodak products Kodak Photo Resist Developer or Kodak Metal-Etch Resist Developer, respectively.

After the resist has been applied to both surfaces of laminate 10, the desired circuit pattern is preferably contact printed onto one or both sides of the resist-coated laminate. Thus, if etching from both sides of the laminate 10 is desired, identical photographic negatives of the circuit pattern are mounted onto the laminate, one on each side thereof. The circuit patterns are carefully positioned so as to insure their alignment. The laminate, and negatives mounted thereto, are then placed under vacuum, and exposed to ultraviolet light while subjected to the vacuum. The vacuum operation insures intimate contact of the negatives to laminate so that no diffusion of the ultraviolet light will occur, and destroy or dilute the accuracy of the final resulting pattern. The printing of the circuit is generally designated by the block 24.

The non-exposed portions of the resist (i.e., the non-circuit portions) are then developed by the solvents mentioned above, the exposed portions (i.e., the circuit portions) retaining the resist or masking. In effect, therefore, the development (step 26) produces an image on the laminate 10 that is the reverse of the image originally mounted on the laminate; thus, a positive circuit image on the laminate 10 is produced from the negative of the circuit. The method of cleaning (20), applying resist (22), the printing (24), and the developing (26) to obtain the image are conventional in the chemical milling or etching art. The etching of the copper cladding (step 28) by means of ferric chloride in weak hydrochloric acid and sulfuric acid solution is also conventional, and no further description of the steps, to this point, is necessary.

Figures 4, 5, 6:
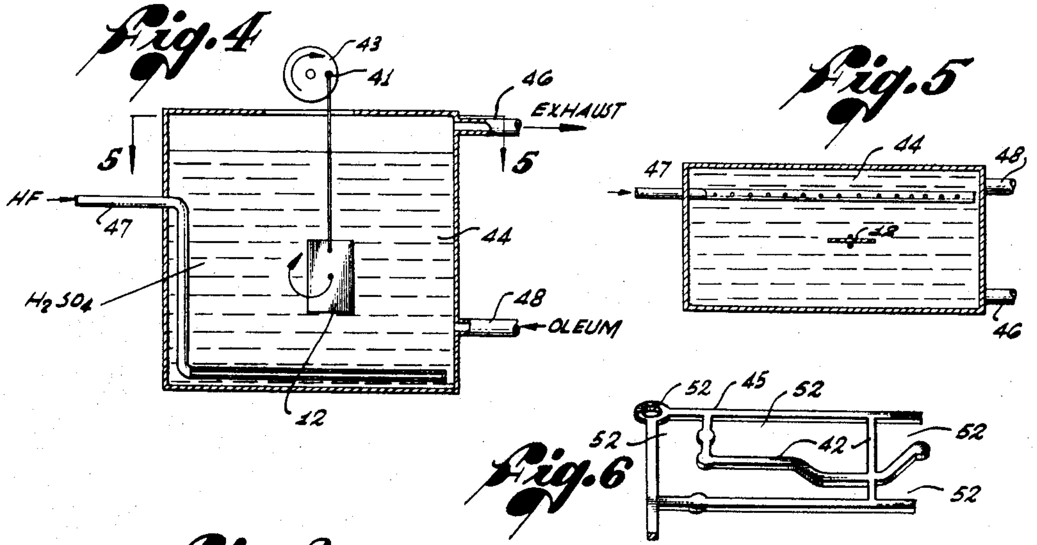
FIGURE 4 is a cross-section, in side elevation, of a means for performing the etching or chemical milling steps of my process.
FIGURE 5 is a cross-sectional view, in plan, taken along the line 5—5 of FIGURE 4.
FIGURE 6 is a fragmentary perspective view of a finished preformed circuit made in accordance with my invention.

What is believed to be novel, as well as a great advance in the art, is the method and means for etching or chemical milling of the glass-epoxy laminate or material outside of the masked circuit pattern to form the preformed circuit 40 shown in FIGURE 6. This etching step is indicated as being performed at the block 30 in FIGURE 3.

The etching step is performed by means of apparatus shown schematically in FIGURES 4 and 5. The piece 10, to be etched, is attached to the eccentric 41 of a motor-driven wheel or disk 43, in any suitable manner. The piece 10 is thus submersible in the etching bath 44 of my invention while being simultaneously agitated in a generally circular pattern following the path of the rotating eccentric 41. Any other suitable means for achieving agitation of the piece 10 to be etched may be employed. For example, the etching solution 44 can be sprayed onto the base laminate or piece 10.

The solution 44, for the etching of glass-plastic resin composites, has an initial composition, falling within the following limits, generally speaking:

55–75%[1] sulfuric acid or 40–62% $SO_3$
8–18% hydrofluoric acid or 8–18% HF
16–40% water or 26–52% total water The solution 44 must have a minimum weight ratio of about 1.5 to 1 of water to hydrofluoric acid in order to retain any hydrofluoric acid in solution. Furthermore, the water content of solution 44 should preferably be maintained between certain critical limits, to be defined hereinafter, for the maximum etch rate to be attained. It is found that the ratio of sulfuric acid to hydrofluoric acid preferably lies between about 3:1 and 9:1, and the water content of the solution 44 varies somewhat, depending upon the exact ratio of acids chosen.

The rate of attack on the epoxy and glass is adjusted to the desired proportions by the amount of sulfuric acid present and the amount of hydrofluoric acid present at any given temperature. Thus, in etching glass-epoxy laminate EG–758–T Micaply, manufactured by The Mica Corporation, the solution 44 preferably initially comprises about 68% sulfuric acid, about 11% hydrofluoric acid, and about 21% water.

The sufuric acid content can be reduced as low as 55–60% and the hydrofluoric acid raised to about 13–18% if substantially more glass is present in the glass-epoxy laminate. The amount of water present should be set initially at about 31% or 32% for maximum rate of operation of this etch solution, as will be seen.

If the water to HF ratio of solution 44 is set initially at less than a 1.5 to 1 ratio in solution 44, the hydrofluoric acid does not remain in solution, as has been mentioned. All of the HF would pass off as a gas through the exhaust 46. (The operating temperature during etching generally is maintained between 120° F. and 160° F. The etching bath is operated at atmospheric pressure.) The etch rate of the base laminate is thus effectively nil. On the other hand, if the water to HF weight ratio lies above about 4:1, the etch rate again falls to zero.

Figure 8:
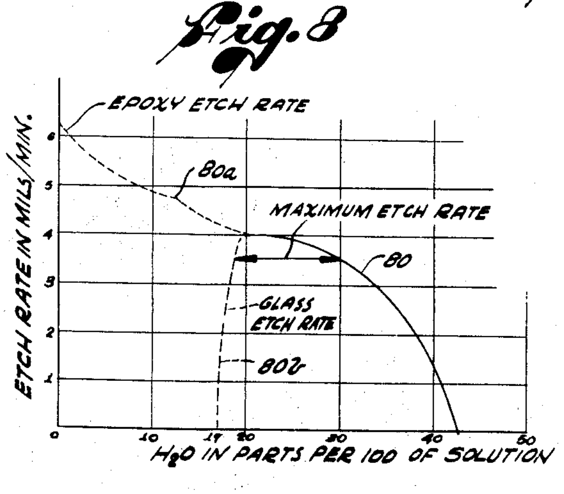
FIGURE 8 is a graph of etch rate vs. amount of water present in an etch solution of my invention.

The solid curve 80 of FIGURE 8 is a typical curve showing the criticality of water content on the rate of etch of the composite base laminate when the $H_2SO_4$:HF ratio is about 6:1. When the $H_2SO_4$:HF ratio is about 6:1, the optimum water content for maximum etch rate of the composite is about 18–30% as shown in FIGURE 8. The dotted curve 80*a* of FIGURE 8 merging into the peak of the solid curve 80 is a curve of epoxy etch rate vs. water content. The dashed curve 80*b* merging into the peak of the solid curve 80 is a curve of the glass etch rate vs. water content. It will be seen that, in addition to achieving the maximum etch rate of both components of the base laminate when the water content is about 18–30%, the rate of etch of each component proceeds at substantially equivalent rates when the water content is maintained at about 18–30%.

When the $H_2SO_4$:HF ratio is set at the minimum 3:1, the minimum water content for glass etching moves to about 27%, by weight, of the solution. The general shape of the curves shown in FIGURE 8 are maintained, however, the composite etch rate peaking out at about 31% water. When the $H_2SO_4$:HF ratio is set at the maximum 9:1, the minimum water content required is about 14%. The general shape of the curves shown in FIGURE 8 are maintained, however, the composite etch rate peaking out at about 18% water.

[1] All percentages are weight percentages and the etch solution 44 will be treated as containing sulfuric acid rather than $SO_3$ because there is always sufficient water present in the etch solution for the particular etching processing here under discussion.

It will thus be understood that, in setting limits for maximum operation, i.e., maximum etch rate, a water content of between about 16–27% is required when the $H_2SO_4$:HF ratio is about 9:1. In the case mentioned earlier of a 55–60% sulfuric acid-13–18% hydrofluoric acid etch, the water content should lie between 28–40% and preferably be initially set at 31% or 32%. A water content of between about 28% to 40% is required when the $H_2SO_4$:HF ratio is about 3:1. In summary, then, as the $H_2SO_4$:HF ratio increases from 3:1 to 9:1, the optimum water content for maximum etch rate decreases from about 40% to 16%.

In the past, hydrofluoric acid in liquid form has been introduced into a sulfuric acid solution for etching. The liquid hydrofluoric acid is normally a 70% solution of hydrofluoric acid and 30% water. Thus, initially, the potential etch rate may be near the peak of the curve (if the water content is initially in the optimum range), but the water content of the solutions of the prior art quickly increase for several reasons. First, as etching proceeds in the hydrofluoric acid (70% HF)-sulfuric acid solution of the prior art, the water content increases rapidly, probably because of the reaction of the plastic (e.g., epoxy) resin with the sulfuric acid, resulting in carbon and water. In order to increase the etch rate, additional hydrofluoric acid is introduced, but since 3 parts water is added for every 7 parts hydrofluoric acid under the prior art method, this mode of "rejuvenation" of the etch bath results in uncertainties in the etch rate and operation at less than the maximum level possible. Also, the glass itself reacts with HF to produce silicon tetrafluoride (a gas) and water.

In order to avoid these disadvantages of prior art etch solutions, I find that, after setting up the etch solution 44 so that the optimum amount of water is initially present in the solution, I can introduce liquid anhydrous hydrofluoric acid, via line 47, under pressure (e.g., 10 p.s.i.g. or higher) into the solution 44 as etching proceeds. Thus, as etching proceeds, by means of solution 44 of my invention and the water level increases due to the interreaction of epoxy resin with sulfuric acid, the need for additional hydrofluoric acid to counterbalance the water increase and bring the water proportion down to the optimum level is supplied simply by 100% hydrofluoric acid, (technically hydrogen fluoride).

Preferably 165% sulfuric acid (or essentially pure $SO_3$) is also introduced into the solution 44 as the anhydrous HF is introduced. The oleum is introduced in a line 48, and contains 65% $SO_3$ (sulfur trioxide) and the water produced by the aforesaid reactions is absorbed by the $SO_3$ in the oleum to produce sulfuric acid. Thus, it will be seen that as the water is produced by the epoxy-sulfuric acid reaction, it can be absorbed by the $SO_3$ of the oleum. Additional sulfuric acid is thus added to the solution 44 which is counterbalanced by the addition of anhydrous hydrofluoric acid to maintain the desired ratio.

It can thus be seen that the effective water addition to the solution 44 is zero throughout the etching process, while the ratio of $H_2SO_4$:HF is maintained constant throughout the etching process.

A specific example of my process for etching (step 30) the copper-epoxy base laminate 10 follows.

The base laminate 10 (EG–758–T, Micaply, 0.093" thick, 1 ft. square) after having the copper etched therefrom, is introduced into an etch solution 44, maintained at about 140° F. in the manner shown in FIGURE 4. The laminate 10 has a resist deposited over the circuit pattern.

The etch solution 44 comprises initially 67 parts $H_2SO_4$
11 parts HF
22 parts water Sufficient etch solution is present to enable complete immersion of the piece 10 to occur at all times during etch.

The etching proceeds from both sides of the piece 10 at a rate of about 4 mils/min. In order to maintain this each rate over the approximately 11 minutes required to mill completely, through the laminate, 0.1# oleum (0.032#$SO_3$) is introduced together with 0.016# anhydrous HF (under 10 p.s.i.g. pressure).

The $SO_3$ thus introduced reacts with the water produced by the epoxy resin-sulfuric acid reaction, and the HF added is sufficient in amount to maintain the initial ratio of sulfuric acid to HF.

Since no water is effectively added to the solution 44 and since the ratio of sulfuric acid to HF remains unchanged, the rate of etch of each component of the base laminate 14 will remain unchanged. The etch will proceed at the maximum desired rate since the water is effectively disposed of. After the milling, the part is rinsed and dried. It is then ready for incorporation into an electrical circuit.

A portion of the product 40 resulting from the etch is shown in FIGURE 6. The unetched circuit path is indicated by the numeral 42, and the milled portions are indicated by the numeral 52. A peripheral frame 45 temporarily supports the circuit path 42.

Figure 7:
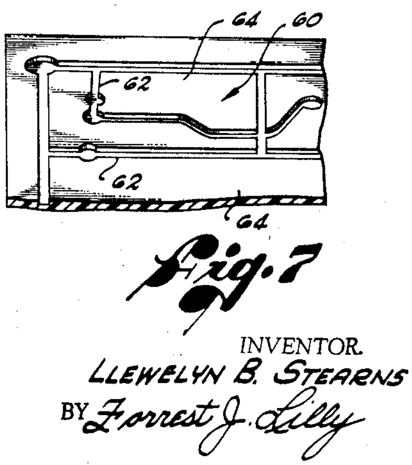
FIGURE 7 is a fragmentary perspective view of a finished insulation board made in accordance with my invention.

In FIGURE 7, an epoxy-glass insulation board 60 is shown having etched portions 62 and unetched portions 64. The etched portions 62 correspond to the circuit portions 42 of FIGURE 6, and the unetched portions 64 correspond with the milled portions 52 of FIGURE 6. In order to make the insulation board 60 which is the reverse of the preformed circuit of FIGURE 6, one may start with unclad glass-epoxy base laminate, apply the photosensitive resist, print a positive of the circuit on the laminate, develop a negative of the circuit on the laminate, and proceed directly with the glass-epoxy etch (step 30). The circuit pattern can now be etched, as described earlier with reference to the etching of laminate 10, resulting in board 60.

My invention is not necessarily restricted to the addition of $SO_3$ or oleum to absorb water produced together with the introduction of anhydrous HF under pressure. Thus, the use of $SO_3$ may be dispensed with if, for some reason, the water increase is not very great. The prevention of any water increase, by avoiding the introduction of 70% HF and 30% water as in the past, is in and of itself a substantial advance in the art.

My invention is not restricted to the use of glass-epoxy laminates, but also includes the use of glass-polyester resins such as glass-reinforced Mylar® (a Du Pont product) laminates, and, of course, glass alone, as will be described.

The glass fibers and forms thereof are the same as those described earlier in this specification. The polyester resins employed are any of those specified in the Modern Plastics Encyclopedia, 1963 Issue, vol 40, No. 1A (published September 1962 by Plastics Catalogue Corp.) at pages 206–214, e.g., the polyester resulting from the reaction of ethylene glycol and pthalic anhydride. This section of the encyclopedia is incorporated in this specification by the foregoing reference.

The polyester-glass laminate, whether copper clad or not, is processed and etched in the same manner as the glass-epoxy laminate set out herein.

Turning now to the etching of glass alone, the process followed is similar to that set out in detail with reference to the glass-plastic resin etching. The major difference lies in the somewhat different proportion of ingredients required for a closely controlled etch of the glass.

For most applications, close control of the etch on glass is very important. For example, clear glass of, say, 1/16" to 1/8" thickness is etched in order to produce a nonreflective surface for use in protecting pictures. If the etched surface of the glass is too deeply or unevenly etched, a surface reflectivity may well result.

In general, the etch solutions of my invention heretofore described, for the purpose of etching glass and certain plastic resins simultaneously, employed from about 40% to 62% $SO_3$, 26% to about 52% water and 8% to 18% HF. The ranges of operation were set forth in column 5 of this specification in terms of sulfuric acid, for the sake of simplicity. In the etching of glass alone, however, it is found that the use of amounts of total water in the etching solution greater than about 25% cause much too high a rate for most glass etching applications and the total water content is reduced considerably so that it is maintained somewhere between about 5% and about 25%. Since sulfuric acid contains about 18% water, it is obvious that at the lower water contents in the range, there is insufficient water to form sulfuric acid; oleum actually is present.

The initial etch solution employed for the etching of glass alone falls within the following limits:

50–75% $SO_3$
10–40% HF
5–25% water

The amount of water employed in the etch solution appears to be of major significance in achieving a close control on the etch rate of the glass. The amounts of $SO_3$ and HF present do not appear to be nearly as important. Thus, if 5% total water is maintained in the etch solution, a closely controllable etch rate of approximately 1/10 mil per minute can be maintained and if the etch solution contains about 25% total water, an etch rate of about ½ mil per minute is maintained.

As described previously with reference to the etching of glass-plastic resin composites, the regeneration of the etch solution takes place by means of the addition of $SO_3$, or oleum (containing 6% water) together with anhydrous HF. It will be understood that $SO_3$ is preferred to be added since the water content is slightly increasing due to the interreaction of the glass and HF to form $SiF_4$ and water, viz., $SiO_2+4HF \rightarrow SiF_4+2H_2O$. The rate of addition of $SO_3$ and HF is such that the HF used up is replaced and $SO_3$ added so that the $SO_3$ to HF ratio is maintained. In this way, the percentage of water in the etch solution is maintained at approximately the same level as its initial level. Of course, where the rate of etch is not critical, oleum can be added and the water content will then vary as the etching proceeds to some extent.

The temperature at which the etch solution is maintained is normally in the range of between about 85° F. to 100° F. At these temperatures, the ratio of water to HF need not be more than about 0.5 to prevent the HF from passing off as a gas.

The etching of the glass alone may be advantageously performed by means of the apparatus shown in FIGURES 4 and 5 as described previously on page 11 of this specification. The means for regeneration of the etching bath for glass alone is also the same as that previously described herein.

A specific example of my process for etching glass follows:

Clear glass weighing 16 ozs. per square foot, and 80/1000 inch in thickness, is introduced into an etch solution maintained at about 100° F. in the manner shown in FIGURE 4.

The etch solution comprises initially 60 parts $SO_3$
35 parts HF
5 parts water

Sufficient etch solution is present to enable complete immersion of the glass to occur at all times during etch.

The etching proceeds from both sides of the glass at a rate of about 0.1 mil./min. In order to maintain this etch rate, 0.0084 oz. $SO_3$/min./sq. foot is introduced together with 0.0075 oz. anhydrous HF (under 10 p.s.i.g. pressure) per minute per square foot.

The amounts of $SO_3$ and HF added are sufficient to maintain the weight percent of water at about 5 weight percent. The $SO_3$ to HF ratio is also maintained.

Another example of my process for etching the same clear glass, but at a higher rate follows: The glass is introduced into an etch solution maintained at about 100° F. in the manner shown in FIGURE 4.

The etch solution comprises initially 60 parts $SO_3$
15 parts HF
25 parts water Sufficient etch solution is present to enable complete immersion of the glass to occur at all times during etch.

The etching proceeds from both sides of the glass at a rate of about 0.5 mil/min. In order to maintain this etch rate, 0.0168 oz. $SO_3$/min./sq. foot is introduced together with 0.029 oz./min./sq. foot anhydrous HF (under 10 p.s.i.g. pressure).

The amounts of $SO_3$ and HF added are sufficient to maintain the weight percent of water at about 25 weight percent. The $SO_3$ to HF ratio is also maintained.

It will therefore be seen that my process for etching glass-plastic resin composites comprises the immersion of the piece to be etched in a solution initially containing $SO_3$, HF and water, the water content being rather critical with respect to the rate of etch. Total water contents of between about 5 to 25% are preferred for lower controlled rates of etch of glass alone, but where higher rates of etch of glass alone are concerned or in the etching of glass-plastic composites, a total water content of between about 26 weight percent up to 52 weight percent is employed.

In order to maintain the etch rate at or close to the initial rate, a method and means are provided for maintenance of water percentage in the etch solution at the same, or approximately the same, level as the initial level by means of the addition of $SO_3$ or oleum and anhydrous HF in proportions such that the loss of HF is made up, and so that the $SO_3$ added maintains the initial ratio of $SO_3$ to HF.

While I have described several preferred embodiments of my invention, it will be understood that changes and modifications can be made which lie within the scope of my invention. Therefore, I intend to be bound only by the claims which follow.

I claim:

1. In a process for etching glass, the improvement which comprises:
contacting said glass with an etch solution initially comprising approximately 50–75% sulfur trioxide approximately, 10–40% hydrogen fluoride, and a predetermined percentage of water in the range falling between about 5% to about 25% water; and
adding sulfur trioxide and hydrogen fluoride into said etch solution, as the etching of said glass proceeds, in such proportions as to maintain the water content at approximately said predetermined percentage within said range of from between about 5% to about 25% water.

2. The process of claim 1 wherein said sulfur trioxide is added as oleum.

3. The process of claim 1 wherein said etching solution is maintained at a temperature of between about 85° F. to about 100° F.

4. In a process for controllably etching material selected from the group consisting of glass reinforced epoxy resin and glass reinforced polyester of the type resulting from the reaction of ethylene glycol and phthalic anhydride, which comprises:
contacting said material with an etch solution initially comprising approximately 55% to 75% sulfuric acid, approximately 8% to 18% hydrofluoric acid and approximately 16% to 40% water; and
introducing oleum and anhydrous hydrofluoric acid into said etch solution, as the etching of the material proceeds, in such proportions as to control the water content within the limits of 16% to 40% in said etch solution.

5. The process of claim 4 wherein said oleum is 165% sulfuric acid.

6. The process of claim 4 wherein the initial composition of said etch solution is about 68% sulfuric acid, about 11% hydrofluoric acid and about 21% water.

7. The process of claim 4 wherein said etching solution is maintained at a temperature of between about 120° F. to 160° F.

8. The process of claim 4 wherein said initial ratio of sulfuric acid to hydrofluoric acid is 3:1, and said water is initially present in an amount of about 16% to 27%, by weight, of the weight of said etch solution.

9. The process of claim 4 wherein said initial ratio of sulfuric acid to hydrofluoric acid is 6:1, and said water is initially present in an amount of about 18% to 30% by weight, of said etch solution.

10. The process of claim 4 wherein said initial ratio of sulfuric acid to hydrofluoric acid is 9:1, and said water is initially present in an amount of about 28% to 40%, by weight, of said etch solution.

11. The process of claim 4 wherein said etch solution is maintained at substantially its initial composition by the introduction of hydrogen fluoride and sulfur trioxide into said etch solution as the etching proceeds.

12. The process of claim 4 wherein said hydrogen fluoride is introduced, as a liquid under pressure, into said etch solution.

References Cited by the Examiner

Reed: Etching of Epoxy Glass Circuit Board, IBM Disclosure Bulletin, vol. 6, No. 6, January 1964.

ALEXANDER WYMAN, *Primary Examiner.*

JACOB STEINBERG, *Examiner.*